June 4, 1935. W. F. EISENHAUER ET AL 2,003,709
TOOL FOR RESERVICING SPRINGS EQUIPPED WITH SPRING COVERS
Original Filed Aug. 17, 1933
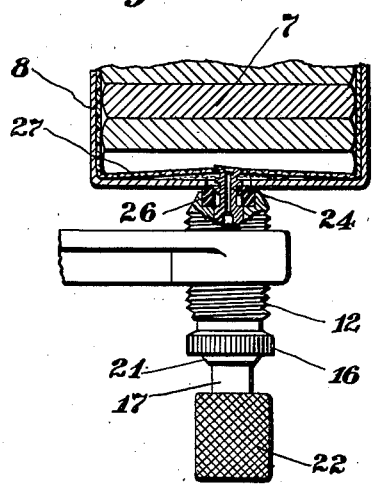
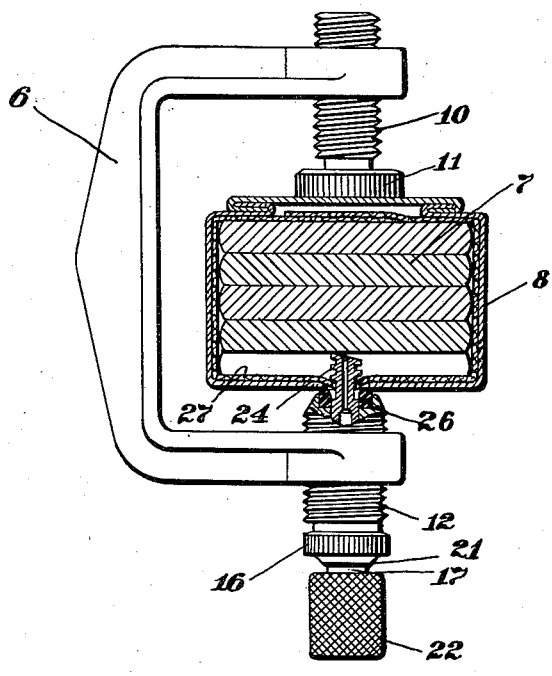
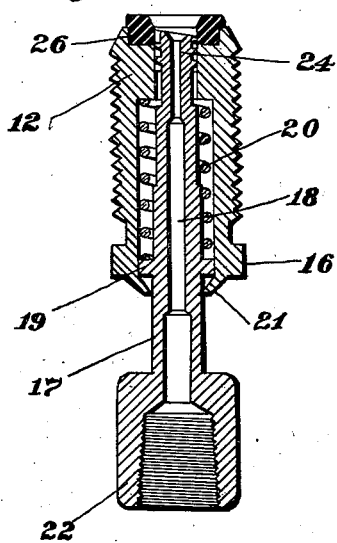
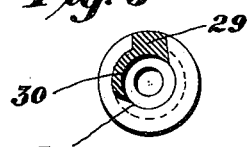
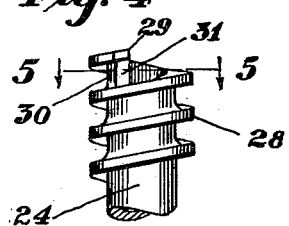
Inventors Patented June 4, 1935

2,003,709

UNITED STATES PATENT OFFICE 2,003,709

TOOL FOR RESERVICING SPRINGS EQUIPPED WITH SPRING-COVERS

Warren F. Eisenhauer, Cambridge, and Warren T. Ferguson, Waban, Mass., assignors to Anderson Manufacturing Company, Cambridge, Mass., a corporation of Massachusetts Continuation of application Serial No. 685,566, August 17, 1933. This application July 6, 1934, Serial No. 733,972

19 Claims. (Cl. 184—105)

This invention relates to the servicing of multiple leaf springs when equipped with spring-covers. This servicing is termed "re-greasing" although it is not a greasing or lubrication of the kind that causes excessive flexibility of the springs but rather an application to the springs of a graphite compound which, while functioning as a lubricating grease, is especially prepared for maintaining a controlled interplate friction, thus stabilizing the action of the springs and maintaining riding comfort. One large use of spring-covers which requires servicing of the enclosed springs from time to time in order to maintain a predetermined spring action is found in the motor car industry.

If the spring-cover equipment is installed by the car manufacturer the spring is serviced by thoroughly covering each separate plate, particularly over their contact areas, preferably with a graphite grease compound that acts as a stabilizer and packing after final assembly. If the springs are to be initially serviced and covered by the car owner then the plates of each spring are separated for receiving the stabilizing compound between them. Just before applying the covering materials more of the compound is applied to the exposed surfaces of the spring. The spring-cover holds this compound in place and keeps out dirt and water, the latter being very detrimental to satisfactory spring action. The bulk of present day spring-covers are metallic, although flexible materials are still in use to some extent, and usually a duck or canvas liner is wrapped about the packed spring before the cover is applied.

During the years that spring-covers have been used it has been found that certain conditions make it advisable to re-service the spring. Re-servicing may be accomplished by removing the covering material and re-packing the spring plates with the stabilizing compound or the plates may be re-packed through the cover and liner without removal from the spring by the use of the service tool of this invention.

One object of this invention is to provide a service tool adapted for use with a pressure grease gun enabling a service station operative properly to re-service multiple leaf springs equipped with any type of spring-cover. It is highly important that the compound employed for re-servicing, especially prepared for controlling interplate friction and stabilizing spring action, be introduced within the spring-cover in such a manner that it will reach the spring and be spread between its plates. The method of application enabled by the service tool of this invention is effective to insure satisfactory re-servicing, which is a further objective.

To the accomplishment of these objects and such others as may hereinafter appear the invention comprises the features and combinations of parts forming the tool and the method of re-servicing the plates of a covered spring hereinafter described and then particularly pointed out in the appended claims.

The preferred form of the invention is illustrated by the accompanying drawing, in which:

Figure 1 is a view, partly in elevation and partly in cross-section, of the position of the compound serving-section of the tool at the start of the re-servicing operation;

Fig. 2 is a view, in cross-section, of the service tool clamped in position for re-servicing a spring equipped with a spring-cover, the serving-section being in its final position for introduction of the stabilizing compound inside of the liner;

Fig. 3 is a detail view, in cross-section, of the serving-section unit of the tool;

Fig. 4 is an enlarged fragmentary view, in elevation, of a suitable form of injection head for the serving-section of the tool; and Fig. 5 is a sectional view of the injection head taken on the line 5—5 of Fig. 4.

In the embodiment of the invention illustrated in the drawing the service tool in its preferred form includes a C-frame clamp 6 dimensioned to receive a spring 7, the opposed arms thereof constituting clamping members enabling it to be secured to an enclosing spring-cover 8 while re-servicing proceeds. The upper arm of the C-frame has an adjustable clamp 10 threaded therethrough and its lower arm has a clamping sleeve 12 threaded therethrough. This sleeve forms a support for the separable stabilizing compound serving-section or duct member having an injection head through which the compound is introduced within the spring-cover. The C-frame 6 maintains the two clamping members in axial alignment. The upper clamp has a knurled shoulder 11 for facilitating adjustment and the sleeve 12 has a knurled shoulder 16 for the same purpose.

As best illustrated by Fig. 3 a satisfactory construction of the stabilizing compound serving-section comprises a plunger 17 supported within the sleeve 12, having a continuous axial passage or duct 18 and a guiding flange 19. A compression spring 20, lying between the flange 19 and a shoulder within the sleeve, tends to continually force the plunger 17 outward (downward as illustrated). After assembly, in order to limit outward movement of the plunger under the influence of the spring 20, the sleeve lip 21 may be peened inward as shown best in Fig. 3.

The outer end of the plunger 17 terminates in a hollow head 22 communicating with the duct 18 and threaded internally to receive any standard grease gun fitting to which the complementary fitting on the hose of a pressure grease gun may be applied. The inner end of the plunger 17 constitutes an injection head 24 which is provided with a special thread or helix at its working end (Figs. 4 and 5) to facilitate entry of the injection head through the fabric liner within the spring-cover. The spring 20 normally maintains the working head housed and protected within the sleeve 12 when the tool is not in use. The extreme inner end of the sleeve 12 may be counter-bored and undercut to hold an annular compressible washer, such as a rubber cushion 26, for engaging the outer surface of the spring-cover.

The spring is prepared for re-servicing by jacking up the car body in such a way as to separate the plates of the spring so that the stabilizing compound, when injected inside of the spring-cover, will flow between them. When first re-servicing a spring equipped with a metal cover which does not have an oil hole, a hole large enough to permit the injection head 24 to pass through is drilled through the metal, most conveniently in the bottom wall of the cover, about one-third of the way from the eye of the spring to the axle. This location enables an injection of the compound beyond the end of one of the shorter plates (see Fig. 2). For convenience, drilling through a lap of the spring-cover units should be avoided. Spring-covers of flexible material such as fabric or leather substitutes ordinarily require no drilling. To position the service tool the upper clamp is set so that the distance between it and the sleeve 12 is a little more than the thickness of the covered spring at the point of drilling and, after placing the C-frame about the spring-cover with the clamp 10 above, the injection head 24 is pushed up through the sleeve 12 of the stabilizing compound serving-section and is passed into the hole through the cover by compressing the spring 20, engaging and forcing the fabric liner 27 inward until it is taut (see Fig. 1).

Referring now to Figs. 4 and 5 illustrating the injection head, it is observed that the flange of each thread 28 has generally parallel faces and is of considerable depth so that this special thread is more in the nature of a helical groove permitting the head 24 easily to thread itself through the fabric liner once the fabric has been punctured. To insure of entry of the working end of the injection head through the liner the first or end thread is sheared axially through the root 30, which it will be observed is of substantial length, to the shelf of the second thread. The end thread, if the threads have been made in a screw machine, is also sheared along the helical thread shelf throughout one complete turn from the top to the base of the axial shear. The helical turn 29 thus left at the extreme working end of the head may consist of the original first thread or of parts of the original first and second threads according to the location of the axial shear cut either at or near to the fadeaway point of the end thread. The edge of the thread root thus exposed may be beveled and sharpened to provide an axial cutting edge 31, forming a self-cutting screw for passing the injection head through the fabric liner, or through a flexible spring cover and its liner if any.

With the injection head pressed against the taut liner the plunger 18 is rotated to the right causing the point at the sheared end of the helical turn 29 to grip and pierce through the fabric far enough to permit the knife 31 to operate (see Fig. 1). After, or before, the last thread 28, of the illustrated injection head, has passed through the fabric of the liner, pressure on the plunger 18 is relieved and the spring 20 snaps it back within the sleeve 12. The depth of the thread flange prevents the head from being withdrawn from the liner and serves as a clamp to hold the pierced liner jammed against the edge of the hole in the spring-cover (see Fig. 2). This leaves the injection head inside of the fabric liner 27 and makes certain the compound for stabilizing spring action will not be forced in between the liner and spring-cover 8 but will be applied directly to the plates of the spring. The sleeve 12 is now, if not before, screwed against the bottom of the spring-cover so that the C-frame is held firmly in position, the cushion 26 being compressed to seal the opening through which the injection head extends and thus prevent pressure from within from forcing the compound outside of the liner. It will be recognized that two threads on the injection head, to start with, are the most that are necessary because a single thread-like helix at the working end of the injection head of the plunger is sufficient for threading the tool through the liner.

With the parts as described the fitting on the grease gun hose is applied to its complementary fitting previously seated in the socket 22. The gun is then operated, slowly, to force the stabilizing compound into the spring-cover. When the compound begins to come out at the end of the spring-cover pumping ceases and after waiting a few minutes to permit the compound to spread and reduce the pressure the service tool is removed by reversing the operations described for applying it. The hole through a metal spring-cover may be closed by a plug to prevent leakage and to keep out dirt.

Those skilled in the art will recognize that the stabilizing compound serving-section may be used as a hand tool to be held with its injection head inside of the spring-cover liner while pumping in the compound for stabilizing spring action.

It will be clear to those skilled in the art and with the general objects of the present invention in view, that the invention is not limited to the conjoint use of all of its features nor to the illustrated details of structure since changes may be made in the form, character and relation of the parts within the scope of the invention, characterizing features of which are set forth in the claims by the intentional use of generic terms and expressions inclusive of various modifications.

This application is a continuation of our joint application for United States Patent Serial No. 685,566, filed August 17, 1933, upon the service tool and method of reservicing springs equipped with a spring-cover herein disclosed. While this specification advocates the use of a graphite compound for re-servicing springs equipped with spring covers because of its effect as a stabilizer and packing and its resultant ability to maintain a controlled spring action, it must be clearly understood that this is in no way a limitation upon the invention described and claimed herein. The invention resides in the construction of a tool and in the described method useful for reservicing multiple leaf springs equipped with spring covers with the preferred spring action stabilizing compound or with any other form of grease or lubricant as described in our above-named original application Ser. No. 685,566 capable of being injected through the serving-section of the tool.

A hand service tool embodying the helical, hollow injection head disclosed herein is not claimed in this application because this is the sole invention of Warren F. Eisenhauer and is claimed in his co-pending application Ser. No. 731,556, filed June 20, 1934.

What is claimed as new, is:—

1. A service tool adapted for the injection of a spring action stabilizing compound upon the leaves of a multiple leaf spring equipped with a spring-cover having an inner liner, comprising a sleeve, a hollow plunger held rotatably within said sleeve forming a compound-serving duct, and a head on said plunger characterized by a liner-piercing device for entering through the spring-cover and making a hole in the liner.

2. A service tool according to claim 1 in which said plunger is continually urged outward, away from the spring-cover, within said sleeve but is free to be moved inward to engage and pierce through said liner.

3. A service tool according to claim 1 providing a member for embracing the spring-cover and supporting the sleeve, and means for clamping the inner end of said sleeve against said cover.

4. In a service tool adapted for the injection of a spring action stabilizing compound to the interior of a lined spring-cover, an injection head for piercing the spring-cover liner formed by a self-cutting screw consisting of at least one thread at its working-end, said thread being sheared axially through the thread root and said sheared root being sharpened to a cutting edge.

5. A service tool for re-servicing springs equipped with a spring-cover having an inner liner, comprising a C-frame clamp having opposed members for clamping to a spring-cover, and a stabilizing compound serving-section carried by one of said clamping members providing a duct for the injection of said compound inside of the liner through a hole in the liner and the spring-cover, said serving-section having an injection head reaching through the hole to a point between the liner and the spring.

6. A service tool according to claim 5 in which said clamping member carrying the compound serving-section comprises a sleeve on the C-frame and said duct being formed by a hollow plunger within said sleeve.

7. A service tool according to claim 5 in which said clamping member carrying the compound serving-section comprises a sleeve and said duct being formed by a hollow, axially movable plunger within said sleeve, and means for maintaining the said injection head normally housed within the sleeve.

8. A service tool for re-servicing springs equipped with a spring-cover having an inner liner and provided with a hole for receiving a spring action stabilizing compound, comprising a plunger providing a duct and having an injection head at one end adapted to pass into said hole and through the liner, and means for withdrawing said plunger causing said head to hold the pierced liner jammed against the edge of the hole in the spring-cover, said plunger being adapted for connection with grease supplying means.

9. The method of re-servicing a multiple leaf spring equipped with a spring-cover having an inner liner which includes separating the spring leaves somewhat, introducing a hollow tool through an opening in both the cover and its liner, drawing the liner away from the spring at the point of entry of said tool through the liner, and then forcing a spring action stabilizing compound through said hollow tool between the liner and the spring.

10. The method of re-servicing a multiple leaf spring according to claim 9 which includes sealing the opening in the spring-cover before said compound is introduced within the cover.

11. A tool of the class described having a C-frame one arm of which constitutes a clamping member, a sleeve supported in the other arm of said frame, and a hollow plunger within said sleeve longer than the sleeve and held within the sleeve for both rotary and axial movement relatively thereto, said plunger having a socket at its outer end for receiving a grease gun fitting.

12. A tool of the class described according to claim 11 in which yielding means is provided for maintaining the inner end of said plunger normally housed within said sleeve.

13. A tool of the class described having a C-frame one arm of which comprises a clamping member, a sleeve mounted in the other arm of said frame, a hollow plunger carried by said sleeve, a coiled spring engaging the sleeve and the plunger and acting to house the inner end of said plunger within the sleeve but permitting said inner end to be pushed out of the sleeve, and means for adjusting said sleeve toward and from the opposite clamping member.

14. A tool of the class described having a C-frame one arm of which constitutes a clamping member, and a greasing compound serving-section mounted in the other arm of said frame comprising a sleeve, a hollow plunger having a continuous grease duct therethrough held rotatably within said sleeve, and a means at the outer end of said plunger for receiving a grease gun fitting.

15. A tool of the class described according to claim 14 in which said serving-section is removable as a unit from said C-frame.

16. A tool of the class described comprising a C-frame clamp one arm of which constitutes a clamping member and the other arm having a sleeve clamp opposite said clamping member, and a hollow plunger having a thread-like helix at its working end mounted within said sleeve for independent longitudinal and rotary movement relatively thereto.

17. In a tool of the class described according to claim 16 the provision of means for adjusting said sleeve toward and from the opposite clamping member.

18. A tool of the class described for conveying lubricant through sheet material, said tool presenting two opposed arms as the tool is in lubricant serving position relatively to said sheet material, one of said arms forming one clamping member and the other arm having a sleeve forming an opposite clamp, a hollow plunger held within said sleeve for rotary movement relatively thereto, the head of said plunger having a helical formation to engage and be drawn through said sheet material upon rotary movement of said plunger, and a spring intermediate the plunger and sleeve to urge said plunger longitudinally of said sleeve.

19. An adjustable clamp for engaging opposite sides of the cover of a covered spring and having provision for re-servicing said spring with lubricant through a hole in the spring-cover, comprising an arm adapted to engage one side of the spring-cover, an opposed arm having a sleeve adapted to engage the other side of the spring-cover, a hollow plunger held within said sleeve having a thread-like helix at its head adapted to enter said hole in the spring-cover, and means for tightening said clamp on the spring-cover.

WARREN F. EISENHAUER.
WARREN T. FERGUSON.